Nov. 4, 1969　　　　R. MARCHFELDER　　　　3,475,799
AUTOMATIC RELEASE SEPARABLE FASTENER
Filed Dec. 22, 1967　　　　　　　　　　3 Sheets-Sheet 1

INVENTOR:
RICHARD MARCHFELDER

INVENTOR:

RICHARD MARCHFELDER

United States Patent Office 3,475,799
Patented Nov. 4, 1969

3,475,799
AUTOMATIC RELEASE SEPARABLE FASTENER
Richard Marchfelder, 159-A Lake Ave., Greenwich, Conn. 06830
Filed Dec. 22, 1967, Ser. No. 693,023
Claims priority, application Great Britain, Dec. 30, 1966, 58,335/66
Int. Cl. A44b 19/26, 19/00
U.S. Cl. 24—230        4 Claims

ABSTRACT OF THE DISCLOSURE

A safety belt fastening device for vehicular passengers is provided that will automatically release after impact. This enables accident victims to move or be removed from a vehicle that is engaged in an accident. The device makes use of a cam surface and an engaging pawl that move relative to each othed against a spring bias into engaging relationship on impact so that when the force of impact terminates, the pawl will cause the cam to rotate and release the latching mechanism.

---

This invention relates to safety belts, as commonly used for the protection of persons in aircraft, road vehicles, seat craft, and spacecraft, against the effects of impact of the vehicle or craft with an obstruction.

The primary aim of such belts is to anchor the body of the person to the structure of the vehicle or craft so that injury is not sustained as a result of violent movement with respect to the vehicle or craft when it becomes subject to a very high deceleration. Such deceleration has the effect of projecting the body against parts of the vehicle or craft. For example in an aircraft passenger cabin a passenger would be thrown forwardly against the next seat or a bulkhead, whereas in a motor vehicle he would be thrown against the windshield, instrument panel or fascia, steering wheel, etc., and such a belt properly applied can materially rdeuce or even eliminate injury from this cause. However, as a result of the general crash conditions prevailing, the person wearing the belt will often be at the worst unconscious and at best considerably dazed and un-coordinated, so that he is unlikely to be able to release himself from the belt after the violent motion has subsided. Cases are known in which a pilot or passenger of an aircraft, saved from serious injury in a crash by the fact of wearing a safety belt, has been subsequently unable to effect a quick release from the belt and has suffered fatal injury, usually from burning.

Whilst there are obviously exceptions, it is thought that in the majority of cases of serious impact of a motor vehicle with an obstruction, the chain of events is that a single major deceleration occurs immediately upon impact, whereafter the vehicle is either at rest or six moving relatively slowly so that there is little or no risk of violent relative movement between the passenger or driver, and the vehicle itself. In these circumstances, once the safety belt has performed its task of anchoring the person to the vehicle structure during the violent deceleration, its job is finished. However, it may thereafter become a positive hindrance to free movement of the person, e.g. during rapid escape from a burning vehicle, or dragging of the person clear of a crashed or burning vehicle by helpers, or when a vehicle has become submerged in water.

It has already been proposed to provide fastening devices for safety belts whereby such a belt becomes automatically released, without any action being required on the part of the wearer, after a major deceleration has occurred. The term "major" as used herein is intended to mean those very violent decelerations which result from impact of a craft or vehicle with a stationary object or with another oncoming vehicle or craft.

It is the object of the present invention to improve constructions of such fastening devices.

According to the present invention, a fastening device for a safety belt comprises a first coupling member for securing to a first portion of a belt, a second coupling member for securing to a second portion of the belt, said second coupling member being insertable into said first coupling member, a cam movably mounted with respect to the first coupling member and adapted to engage releasably with the second coupling member to lock said second coupling member in said first coupling member, a cam-release device movably mounted in the first coupling member under the action of return spring loading and included in the coupling between the first coupling member and one or the other of the two portions of belt so as to be subjected to and moved by extreme tension forces exerted on the belt, and means actuated by the return movement of said cam-release device under its spring loading to disengage the cam from the first coupling member.

In a convenient arrangement, the disengaging means include a ratchet and pawl device which over-rides freely during movement of the cam-release device under extreme tension but which engages and effects disengaging movement of the cam during return movement of the cam-release device.

In a first preferred embodiment of fastening device in accordance with the invention, the cam-release device and the cam constitute a rotatable assembly which is movable longitudinally in the first coupling member against the return spring loading and which carries a ratchet over-riding the pawl during movement of the assembly against the return loading but engaging with the pawl during return movement, thereby to rotate the assembly and disengage the cam from the second coupling member. The return spring loading may be effected by a spiral compression spring one end of which is extended to form a resiliently deforamble pawl.

In a second preferred embodiment of fastening device in accordance with the invention, the cam-release device is rotatably mounted in the first coupling member and is coupled to a portion of the belt so as to be rotated against its return spring loading by extreme tension occurring in the belt, the cam and the cam-release device respectively carrying the ratchet or the pawl. By way of example, the cam may carry a resiliently deformable pawl to coact with a ratchet lug carried by the cam-release device, or the cam may carry a ratchet lug to coact with a resiliently deformable pawl carried by the cam-release device.

In order that the nature of the invention may be readily ascertained, three embodiments of fastening device for a safety belt are hereinafter particularly described with reference to the figures of the accompanying drawings, wherein.

Figure 1:
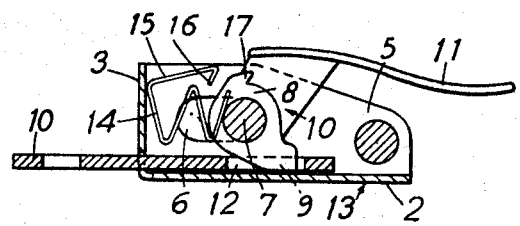
FIGURE 1 is a vertical section showing a first embodiment of buckle in locked condition, but under nil or only normal tension.
Figure 2:
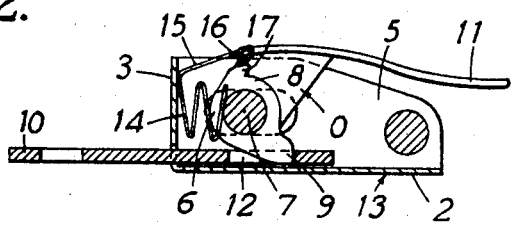
FIGURE 2 is a similar section showing the buckle after commencement of application of extreme tension.
Figure 3:
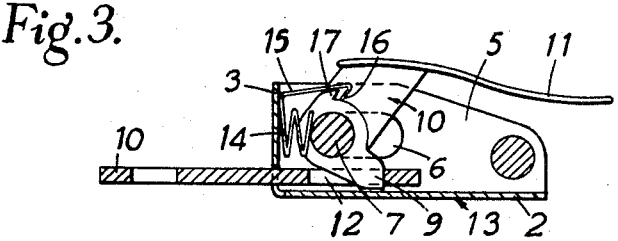
FIGURE 3 is a similar section showing the buckle during application of extreme tension.
Figure 4:
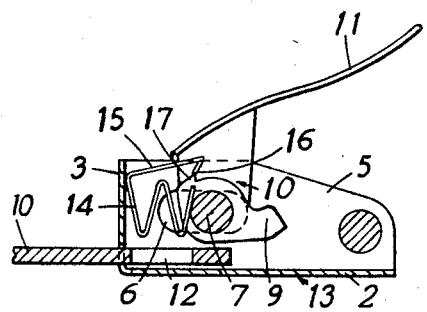
FIGURE 4 is a similar section showing the buckle in unlocked condition occurring automatically after adequate lessening of extreme tension.
Figure 5:
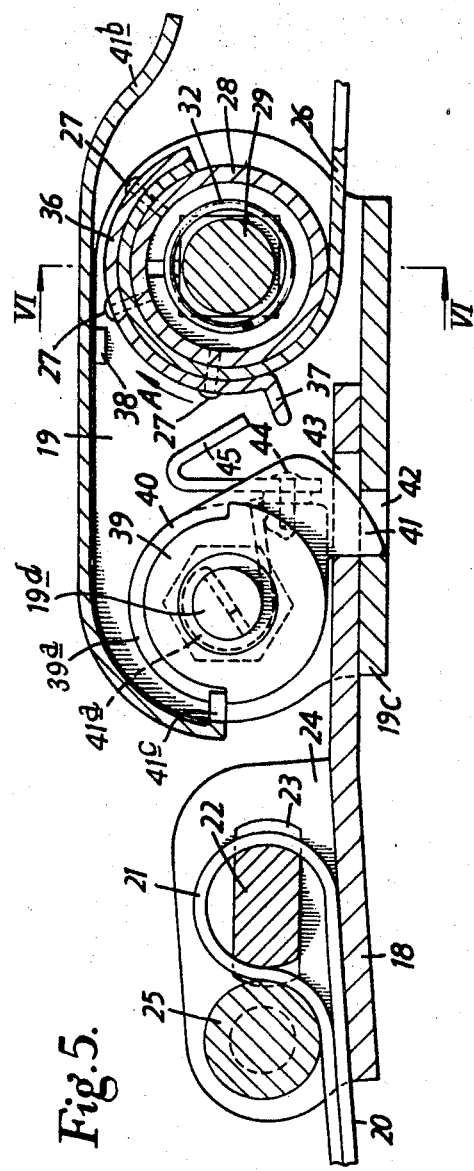
FIGURE 5 is a central vertical section through a second embodiment of safety belt fastening device.
Figure 6:
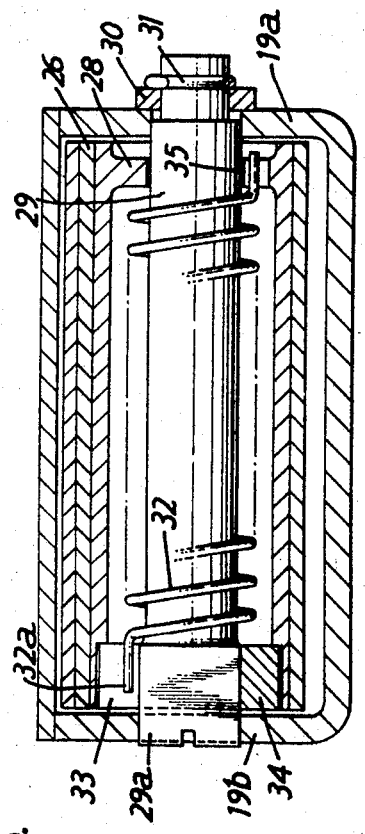
FIGURE 6 is a section taken on the line VI—VI of FIGURE 5.

Referring to FIGURES 1 to 4, a tongue plate 1 constituting a second coupling member is intended to be secured to one portion of safety belt (not shown), and a housing 2 constituting a first coupling member is adapted to be secured to another portion of the belt.

The housing 2 has an upstanding end wall 3 apertured at 4 to permit sliding insertion of the tongue plate 1. On the housing 2 are provided side walls 5 which are slotted at 6 to receive the ends of a shaft 7 carrying a rotatable assembly 8 having a radially projecting cam 9. The shaft 7 is secured to flanges 10 carrying an operating handle 11.

The assembly 8 constituted by the shaft 7, locking cam 8 and handle 11 may be lightly spring-loaded by a spring (not shown) urging it in a clockwise direction in this drawing.

In the condition shown in FIGURE 1, the tongue plate 1 has been thrust into the housing 2, and the leading end of the tongue plate has ridden past the cam 9 until the cam 9 has become engaged into an opening 12. Any tension applied in the direction to remove the tongue plate 1 from the housing will cause the cam 9 to be pressed even more firmly into engagement with the base 13 of the housing.

Within the housing, and butted against the wall 3, there is provided a strong return compression spring 14 acting against the shaft 7. One end of this spring is extended as a pawl 15 carrying a tooth 16 which can coact with a ratchet lug 17. The spring 14 is made strong enough that any normal tension applied, e.g. tension due to body movements and ordinary decelerations of the vehicle, will not permit the shaft 7 to move towards the left-hand side of this drawing. However, when a major deceleration occurs, e.g. upon impact of an aircraft, motor vehicle, or seacraft with a major obstruction, the extreme tension occurring in the belt causes the shaft 7 to move to the left (see FIGURE 2) until the shaft reaches the other end of the slots (see FIGURE 3). During this shifting movement, the ratchet lug 17 has over-ridden the spring-loaded pawl 15, 16.

Upon adequate lessening of the extreme tension, the spring 14 becomes able to shift the shaft 7 back towards the right, during which movement the ratchet lug 17 engages with the pawl and causes rotation of the cam 9 anti-clockwise, thereby lifting it out of the opening 12 and freeing the tongue plate 1 to be withdrawn from the housing 2.

The releasing effect is thus obtained entirely automatically and does not require any action on the part of the wearer. For all normal operation of the belt, the handle 11 can be moved up and down, by simple rotation of the shaft 7 about a stationary axis.

Referring now to FIGURES 5 to 10, there is shown a safety belt fastening device comprising two major portions in the form of a tongue plate 18 and a housing 19. The tongue plate 18 is coupled to one end 20 of one portion of a belt by the engagement of a loop 21 of the belt about a cross-piece 22 slidably mounted at its ends in slots 23 in side walls 24, the application of slight normal tension on the belt causing the cross-piece 22 to slide towards the fixed cross-member 25 so that the belt is gripped tightly. This arrangement is solely for adjustment of total length of the belt, and is not concerned with release of the belt.

An end 26 of the other portion of the belt is wrapped round and secured by rivets 27 to a cylindrical drum 28 journalled for rotation on a fixed shaft 29 which is secured in the walls 19a and 19b of the housing 19. The shaft 29 has at one end a square head 29a which is engaged in a square hole in the wall 19b, whereby the shaft 29 is locked against relative rotation. The other end of the shaft 29 passes through a hole in the wall 19a and receives a washer 30 and an annular spring clip 31 in a groove on the shaft.

About the shaft 29 there is disposed a spiral spring 32, one end 32a of which is engaged in a radial slot 33 cut in an integral hexagon-shaped portion 34 of the shaft 29. The other end of the spring 32 is engaged in a radial slot 35 of an end wall of the drum 28. The spring 32 is so arranged that it tends to drive the drum 28 clockwise in FIGURE 5, as indicated by the arrow "A."

About part of the belt wrapped around the drum 28 there is provided an arcuate plate 36 which is also secured to the drum by the rivets 27 used for securing the belt. This plate 36 has at one end a ratchet lug 37 which projects radially. In the normal condition of use of the belt, the tension of the coiled spring tends to keep the lug 37 abutting on a stop 38 of the housing.

Also journalled for rotation on a shaft 19d fixed non-rotatably in the housing 19 there is provided an assembly consisting of a rotor 39 which is integral with flanges 40 carrying a cam 41. The cam 41 can seat into an aperture 42 in the housing, and thereby limit rotation of the cam in the clockwise direction in FIGURE 5. The cam is spring-loaded clockwise by a coiled spring 41a having one end engaged in a diametral hole in the fixed shaft 19d and the other end bearing on part of the cam. For fastening of the belt, the tongue plate 18 is pushed into the housing between the rotor 39 and the base wall 19c of the housing, causing the rotor and cam to be rotated anti-clockwise in FIGURE 5 against the loading of spring 41a, until eventually the tongue plate 18 has been inserted far enough to permit the cam 41 to enter the aperture 43 aligned with the aperture 42. In this condition, the tongue plate is locked in the housing, and any tension applied to the belt merely presses the cam 41 harder against the base wall 19c.

Also rotatably mounted on the fixed shaft 19c, by side flanges, there is provided a hand lever 41b which can engage with the cam rotor 39 by means of a tongue 41c riding in an arcuate groove 39a of the rotor. It will be seen that, during anti-clockwise movements, the hand lever will drive the cam rotor 39 against the action of the spring 41a thereby to release the tongue plate 18, whereas the cam rotor 39 can itself move anticlockwise with respect to the hand lever 41b without driving the latter.

The hand lever 41b may accordingly serve for simple manual release of the tongue plate.

Mounted on the rotor 39, by rivets 44, there is provided a resiliently deformable pawl 45.

Reference is now made to FIGURES 7 to 10, to explain the sequence of operations.

It is to be assumed that the spring 32 is relatively strong and will serve to hold the drum 28 against rotation by any tension forces exerted on the belt portion 26 as a result of normal wear by the user.

Figure 7:
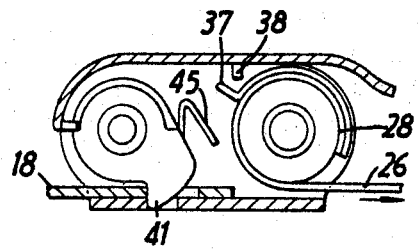
FIGURES 7, 8, 9 and 10 are schematic views to show successive stages in the operation of the fastening device of FIGURES 5 and 6.
Figure 8:
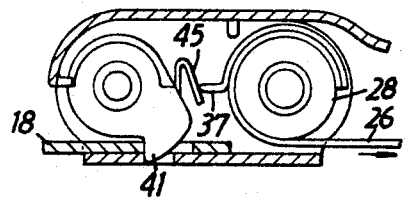
Figure 9:
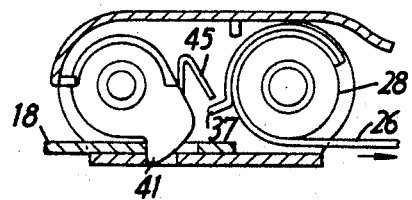
Figure 10:
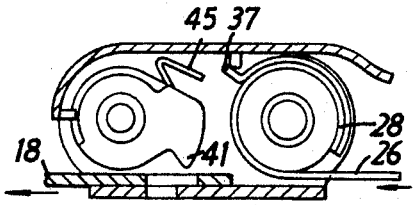

However, in the event of a major tension in the belt, arising for example from impact of an aircraft with the ground or a head-on collision of a vehicle, the extreme tension exerted in the belt causes rotation anti-clockwise (in FIGURE 14) of the drum 28, whereby the ratchet lug 37 commences to move away from the stop 38, as seen in FIGURE 7. Continuance of the extreme tension causes the lug 37 to move past the resilient pawl 45, which is temporarily deformed as seen in FIGURE 8. With still further movement of the lug 37, it passes beyond the end of the pawl, as seen in FIGURE 9 and may eventually abut against the base wall 19c acting as a stop.

As soon as the extreme tension is removed, or becomes less than the torque exerted by the spring 52, the drum 28 rotates back in the other direction (clockwise in FIGURES 7 to 10) and the lug 37 engages under the tip of the pawl 45 and rotates the rotor and cam assembly anti-clockwise against their own lesser spring-loading, thereby disengaging the cam 41 from the aperture 43 of the tongue plate, thus allowing the tongue plate to be freely withdrawn from the housing, and uncoupling the two portions of the belt.

Figure 11:
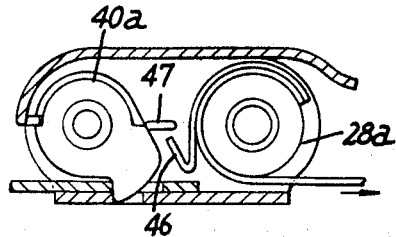
FIGURE 11 is a schematic view, of a third embodiment of fastening device constituting a modification of the device of FIGURES 5 and 6, showing an operating condition corresponding to that of FIGURE 8.

Referring to FIGURE 11, there is seen a modification which is identical with the embodiment shown in FIGURES 7 to 10, with the exception that a resiliently deformable pawl 46 carried by the drum 28a is adapted, during application of extreme tension in the belt, to ride anti-clockwise past a ratchet lug 47 on the rotor 40a, and upon removal of extreme tension to return clockwise and drive the lug 47 and rotor 40a anti-clockwise to release the tongue plate in a similar manner to that described above.

I claim:
1. A fastening device for a safety belt comprising:
   a first coupling member secured to a first section of a belt;
   a second coupling member secured to a second section of a belt adapted to be received by the first coupling member;
   a cam mounted for rotation within the first coupling member, including
      a first cam surface for releasably engaging the second coupling member in locking relationship to the first coupling member, and
      a second cam surface remote from the first cam surface;
   a pawl mounted in the first coupling member;
   means to enable relative movement between the pawl and the cam between a first nonengaging position of the pawl and said second cam surface and a second emergency position in which the pawl engages the second cam surface of the cam;
   spring means to bias the pawl and the cam toward the first nonengaging position;
   resilient means that
      enables the pawl to slide freely over the cam as the pawl and the cam move relative to each other from the first nonengaging position to the second emergency position, and
      secures the pawl in engagement with the second cam surface as the pawl and the cam move relative the each other from the second emergency position to the first nonengaging position, whereby the cam is caused to rotate to disengage the first cam surface from the second coupling member.

2. A fastening device according to claim 1, wherein an operating lever is attached to the cam to enable manual rotation of the cam.

3. A fastening device according to claim 1, wherein the pawl is fixedly mounted on the resilient means within the first member and the cam is mounted for longitudinal reciprocating movement within the first member to permit the relative movement between the pawl and the cam.

4. A fastening device according to claim 1, wherein an end of the first section of the belt is wound, in part, about a shaft mounted for rotation within the first member, the resilient means bias the shaft against rotation, and the pawl is mounted to rotate with the shaft.

References Cited
UNITED STATES PATENTS

| | | |
|---|---|---|
| 3,142,102 | 7/1964 | Saunders. |
| 3,237,265 | 3/1966 | Florian. |
| 3,238,587 | 3/1966 | Goinard. |

FOREIGN PATENTS

| | | |
|---|---|---|
| 1,317,765 | 1/1963 | France. |
| 690,896 | 4/1953 | Great Britain. |

BERNARD A. GELAK, Primary Examiner